April 15, 1952 R. H. CASLER 2,593,103
FLUID PRESSURE CONTROL MECHANISM
Filed Jan. 15, 1945
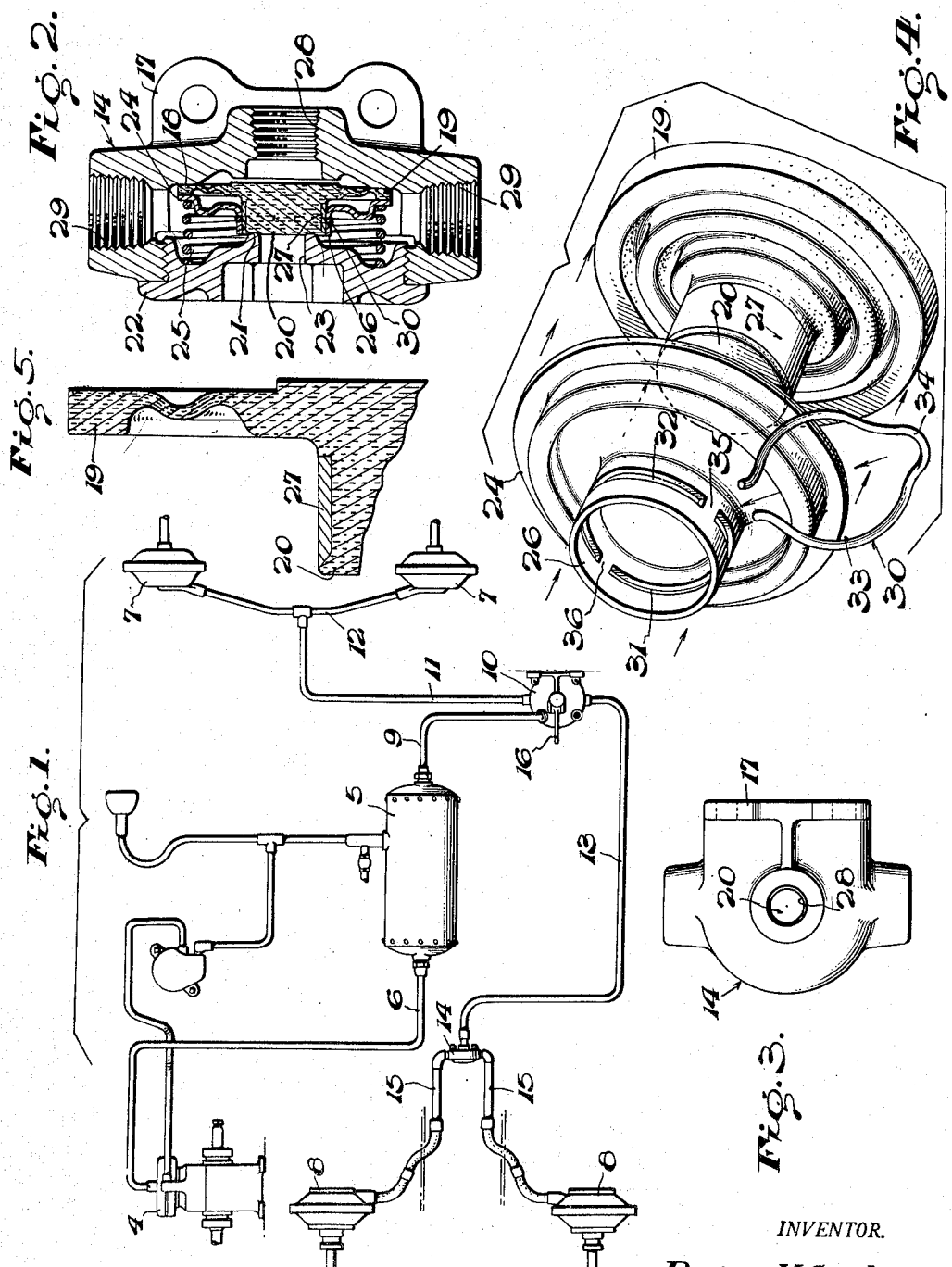
INVENTOR.
BY *Roger H. Casler*
*Scrivener & Parker*
ATTORNEYS Patented Apr. 15, 1952

2,593,103

UNITED STATES PATENT OFFICE 2,593,103

FLUID PRESSURE CONTROL MECHANISM

Roger H. Casler, Washington, Conn., assignor to Bendix-Westinghouse Automotive Air Brake Company, Elyria, Ohio, a corporation of Delaware Application January 15, 1945, Serial No. 572,859

5 Claims. (Cl. 251—119)

This invention relates to fluid pressure control valve mechanism, and more particularly to means for preventing or minimizing vibration of certain of the parts of such control valve mechanisms.

It has been customary in the past to use, in connection with fluid pressure brake systems and similar mechanisms, valve mechanisms controlled by variations of fluid pressure for controlling the flow of fluid pressure to and from the brake actuators, and it has been found that the control valves in valve mechanisms of this type have an inherent tendency to vibrate when subject to variations of fluid pressure, and it is accordingly an object of the present invention to provide means for eliminating or minimizing this vibration.

Another object of the invention is to provide, in connection with valve mechanism of the above type, simple and efficient means for frictionally damping vibration of the valve parts.

Still another object of the invention is to provide, in connection with valve mechanism of the above type, simple and efficient vibration damping means which may be economically constructed and readily assembled in the control valve structure.

The above and other objects of the invention will appear more fully hereinafter from the following detailed description when taken in connection with the accompanying drawing, wherein one form of the present invention is illustrated. It is to be expressly understood, however, that the drawing is utilized for the purpose of illustration only, and is not designed as a definition of the limits of the invention, reference being had for this purpose to the appended claims.

In the drawing, wherein similar reference characters refer to similar parts throughout the several views:

Fig. 1 illustrates diagrammatically a fluid pressure brake system incorporating a control valve mechanism of the type to be described;

Fig. 2 is a sectional view of a fluid pressure control valve mechanism made in accordance with the principles of the present invention;

Fig. 3 is a view of the valve shown in Fig. 2 taken from the right;

Fig. 4 is a partial exploded view in perspective showing certain parts of the valve mechanism illustrated in Fig. 2, and Fig. 5 is a partial enlarged sectional view of the flexible diaphragm shown in section in Fig. 2.

Referring first to Fig. 1, a fluid pressure brake mechanism, which may be of the compressed air type, is illustrated as including a compressor 4 driven by the engine of the vehicle, not shown, and adapted to supply compressed air to a supply reservoir 5 through a discharge conduit 6, the reservoir being adapted to supply compressed air to a pair of rear brake actuators 7 and a pair of front brake actuators 8 through a conduit 9 connected with the rear brake actuators through a control valve 10, a conduit 11 and a conduit 12, and with the front brake actuators from the valve 10 through a conduit 13, a quick release valve 14 of the type illustrated in Fig. 2, and conduit 15 which is connected to the front brake chambers. The control valve mechanism 10 is preferably of the so-called self-lapping type, provided with a control lever 16, and it will be understood by those skilled in the art that the control valve mechanism 10 may be operated by lever 16 to supply fluid pressure to the brake chamber through the connections just described in such a manner that the pressure supplied to the brake chambers is substantially proportional to the degree of movement of the control lever from release position, release of the lever resulting in the release of fluid pressure from the actuators.

In fluid pressure brake mechanisms of the above type, it has been found desirable to provide means for insuring immediate release of the front wheel brakes on release of the control lever of the brake valve in order to minimize the possibility of skidding of the front wheels of the vehicle due to dragging of the brakes, and to this end, it has been customary to provide a so-called quick release valve such as the valve 14, this valve being located adjacent to the front brake chambers and being adapted to exhaust compressed air from the brake chambers directly to atmosphere, thus eliminating the necessity of exhausting this air through the exhaust port of the brake valve through the relatively long conduit system which connects the valve with the front brake chambers. As shown partially in Fig. 2, quick release valves of this type include a casing 17 having an annular valve seat 18 formed in the interior thereof at the right end, this valve seat being adapted to receive the periphery of a flexible diaphragm 19. The central portion of the diaphragm, which is preferably made of rubber or other similar material, is provided with an enlarged leftwardly extending cylindrical portion 20, the left end of which is adapted to act as a valve which engages a seat 21 formed on the interior and of the cover plate 22 threadedly received in the left end of the casing 17, the center of the cover being provided with an exhaust port 23 communicating with atmosphere. In order that the periphery of the diaphragm may be normally maintained against the annular valve seat 18, a ported circular spring seat 24 is positioned within the casing and is normally maintained in the position shown by means of a spring 25 interposed between the left surface of the spring seat and the right surface of the cover. A central bore 26 is provided in the spring seat, this bore being so dimensioned as to slidably receive the extended valve portion 20 of the diaphragm. Thus the spring seat serves as a guide for the central portion of the diaphragm during movement thereof, and in order to facilitate this guide action, an annular ring 27, preferably made of suitable metal such as brass, is molded on the cylindrical portion of the diaphragm extension 20 during manufacture thereof, and is so dimensioned to slide readily through the bore 26 of the spring seat 24. The right end of the casing is provided with a supply port 28 to which the brake valve conduit 13 is connected, and the casing is further provided as shown with outlet ports 29 which are connected to the conduits 15 leading to the front brake chambers 8. Thus when the brake valve is operated to supply fluid pressure to the conduit 13, this fluid pressure enters the valve casing through the port 28, and as the pressure in the casing increases, it serves to move the peripheral portion of the diaphragm to the left in order to permit the flow of fluid pressure by the outer edge of the diaphragm and into the brake chambers through ports 29 and conduits 15. When the flow of fluid pressure ceases, the pressure on both sides of the diaphragm will be substantially the same except for the differential caused by the spring 25, and the air pressure on the right side of the diaphragm will maintain the portion 20 positioned firmly against the exhaust valve seat 21. When the brake valve is operated to release fluid pressure from the conduit 13, the pressure in the port 28 will likewise decrease, and the excess pressure acting on the left side of the diaphragm from the brake chambers through the conduits 15 and the ports 29 will force the central portion of the diaphragm to the right in order to permit fluid pressure to be exhausted to the atmosphere through the discharge port 23, and this exhausting action will continue until the pressure differential between the opposite surfaces of the diaphragm again reaches the value determined by the area of the port 23 and the tension of the spring 25, whereupon the portion 20 will be again moved to the left to close port 23

Due to the relatively large area of the exhaust port, a definite pressure drop is required in the supply port 28 before the pressure acting on the left side of the diaphragm is sufficient to move the central port thereof to the right to open the exhaust port, the result being that when the exhaust port opens, the diaphragm moves fully to the right and allows a large volume of air to be exhausted through the exhaust port, thus tending to reduce the pressure on the left side of the diaphragm to a value below that necessary to insure closing the exhaust valve by the pressure acting on the right side of the diaphragm. This results in an unstable condition which is well known to those skilled in the art, and as a result of this unstable condition, the central and peripheral portions of the diaphragm tend to alternately vibrate back and forth causing a noise which is unpleasant, particularly so on passenger carrying vehicles. It has been found that the application of a slight frictional force to the central portion of the diaphragm will effectively damp out these vibrations, and simple and effective means are provided by the present invention for supplying the necessary frictional force to eliminate this unwanted vibration.

As shown more particularly in Fig. 4, which is an enlarged perspective view of the diaphragm 18, the spring seat 24 and a vibration dampener 30, to be described, the walls of the bore 26 on the valve seat are provided with oppositely disposed slots 31 and 32 arranged as shown, and these slots are adapted to receive and position a vibration dampener ring 30 which is made of any suitable resilient material such as wire in substantially the shape shown in the drawing. This ring is made of a single piece of wire formed to provide partial circular portions 33 adapted to substantially conform to the curvature of the outer surface of the ring 27, a loop portion 34 formed on the right end of the ring being adapted to clear a bar 35 formed by the slots 32 and 33, and the left ends of the member 30 being separated as shown to clear a similar bar 36 oppositely disposed from the bar 35 on the spring seat. During assembly of the control valve mechanism, the dampener 30 is first assembled on the spring seat to engage the sides of the slots 31 and 32, and the extended portion 20 and the ring 27 of the diaphragm are then inserted in the bore 26. The member 30 is so dimensioned as to engage the surface of the ring 27 at the portions 33 with a predetermined slight force, and the diameter of the wire forming the member 30 is so chosen as to substantially eliminate movement of the member 30 between the walls of the slots 31 and 32. In order to minimize the possibility of such movement, however, the member 30 is slightly twisted as shown in such a manner that the portions 33 lie in different planes, the result being that when the member 30 is assembled with the spring seat, the portions 33 are tensioned against the sides of the slots 31 and 32. After assembly of the spring seat, diaphragm and damper ring, the spring 25 is inserted and the cover 22 is threaded into the casing 17 in order to compress the spring against the spring seat.

As heretofore stated, due to the unstable condition of the diaphragm when subjected to variations of pressure, the valve action of the diaphragm tends to release or to admit too much air from and to the interior of the casing due to excessive movement either in the center or at the peripheral portion of the diaphragm, and the friction imparted to the ring 27 by the member 30 introduces a sufficient time lag in the operation of the central portion of the diaphragm to substantially prevent the over controlling action which is responsible for the vibrating condition, thus effectively preventing vibration of the diaphragm and eliminating undesirable noise.

It will be apparent from the foregoing description that simple, inexpensive and efficient means have been provided for frictionally damping the operation of the diaphragm in a valve mechanism of the above described type in order to substantially eliminate undesirable vibration of the diaphragm and consequent noise, this being accomplished by the addition of a single part which is the damping member 30 received in the slots of the spring seat 24.

While the invention has been illustrated and described herein with considerable particularity, it is to be clearly understood that the same is not limited to the forms shown, but may receive a variety of mechanical expressions as will now readily appear to those skilled in the art. Reference will, therefore, be had to the appended claims for a definition of the limits of the invention.

What is claimed is:

1. In a fluid pressure control valve, a casing having intake, outlet and exhaust ports, a valve guide in the casing provided with a central cylindrical bore and an outwardly extending peripheral flange, resilient means interposed between one portion of the casing and the flange for urging the latter toward another part of the casing, a reciprocating valve of flexible material having a cylindrical guide member slidably mounted in said bore and forming an exhaust valve part cooperating with said exhaust port, said valve having also a peripheral portion interposed between said flange and said other parts of the casing and forming an intake valve part cooperating with said intake port, said valve parts being movable relatively to each other, and means for dampening vibration of said valve parts including a pair of oppositely disposed slots in the wall of said bore, and a horseshoe shaped split resilient ring mounted in said slots and having portions in frictional engagement with the surface of said cylindrical guide member, said ring serving to retard relative movement of the guide member and the bore and said slots serving to prevent movement of the ring with the guide member.

2. In a fluid pressure control valve, a casing having intake, outlet and exhaust ports, a valve guide in the casing provided with a central cylindrical bore and an outwardly extending peripheral flange, resilient means interposed between one portion of the casing and the flange for urging the latter toward another part of the casing, a reciprocating valve of flexible material having a cylindrical guide member slidably mounted in said bore and forming an exhaust valve part cooperating with said exhaust port, said valve having also a peripheral portion interposed between said flange and said other part of the casing and forming an intake valve part cooperating with said intake port, said valve parts being movable relatively to each other, and means for dampening vibration of said valve parts including a horseshoe shaped split resilient ring having oppositely disposed circular portions adapted to frictionally engage the surface of said guide member, and oppositely disposed slots in the wall of said cylindrical bore for receiving said ring and preventing movement of the ring with the guide member.

3. In a fluid pressure control valve, a casing having intake, outlet and exhaust ports, a valve guide in the casing provided with a central cylindrical bore and an outwardly extending peripheral flange, resilient means interposed between one portion of the casing and the flange for urging the latter toward another part of the casing, a reciprocating valve of flexible material having a cylindrical guide member slidably mounted in said bore and forming an exhaust valve part cooperating with said exhaust port, said valve having also a peripheral portion interposed between said flange and said other part of the casing and forming an intake valve part cooperating with said intake port, said valve parts being movable relatively to each other, and means for dampening vibration of said valve parts including a horseshoe shaped split resilient ring having spaced open ends on one side thereof, an outwardly extending loop on the opposite side thereof, and oppositely disposed circular portions between said loop and open ends adapted to frictionally engage the surface of said cylindrical guide member, and oppositely disposed slots in the wall of said bore adapted to engage said circular portions of the ring for preventing movement of the ring with the guide member.

4. In a fluid pressure control valve, a casing having intake, outlet and exhaust ports, a valve guide in the casing provided with a central cylindrical bore and an outwardly extending peripheral flange, resilient means interposed between one portion of the casing and the flange for urging the latter toward another part of the casing, a reciprocating valve of flexible material having a cylindrical guide member slidably mounted in said bore and forming an exhaust valve part cooperating with said exhaust port, said valve having also a peripheral portion interposed between said flange and said other part of the casing and forming an intake valve part cooperating with said intake port, said valve parts being movable relatively to each other, and means for dampening vibration of said valve parts including a horseshoe shaped split resilient ring having spaced open ends on one side thereof, an outwardly extending loop on the opposite side thereof, and oppositely disposed circular portions between said loop and open ends adapted to engage the surface of the cylindrical guide member, said ring being twisted slightly at the loop portion whereby the oppositely disposed circular portions normally lie in different intersecting planes, and oppositely disposed slots in the wall of said bore adapted to engage said circular portions and maintain them in substantially the same plane, whereby movement of the ring longitudinally with respect to the bore is prevented during movement of the guide member therein.

5. A fluid pressure control valve comprising a casing provided with aligned inlet and exhaust openings and an outlet opening, a valve within the casing having a central portion normally closing the exhaust opening and spaced from the inlet opening, said valve having a peripheral portion, a valve guide having a cylindrical bore for receiving and guiding the central portion of the valve, and also having an outwardly extending flange engaging said peripheral portion, resilient means interposed between said casing and said flange for normally urging said peripheral portion against the casing to interrupt communication between the inlet and outlet openings, and means for dampening relative movement between the bore and the central portion of the valve for minimizing vibration of the valve including a split ring carried by the wall of the bore and frictionally engaging said central portion of the valve.

ROGER H. CASLER.

REFERENCES CITED

The following references are of record in the file of this patent:

UNITED STATES PATENTS

| Number | Name | Date |
|---|---|---|
| 2,040,580 | Vorech | May 12, 1936 |
| 2,103,725 | Jacobsson | Dec. 28, 1937 |

FOREIGN PATENTS

| Number | Country | Date |
|---|---|---|
| 78,173 | Australia | of 1919 |